United States Patent
Singh et al.

(12) 
(10) Patent No.: US 10,907,983 B1
(45) Date of Patent: Feb. 2, 2021

(54) NAVIGATION INFORMATION ON AN ONLINE SYSTEM

(71) Applicant: Facebook, Inc., Menlo Park, CA (US)

(72) Inventors: Manisha Singh, Redwood City, CA (US); Tao Cui Baecklund, San Jose, CA (US); Rohit Poddar, San Francisco, CA (US); Shashikant Khandelwal, Mountain View, CA (US); Ido Wakrat, London (GB); Robert P. Otillar, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 314 days.

(21) Appl. No.: 15/886,445

(22) Filed: Feb. 1, 2018

(51) Int. Cl.
  *G01C 21/36* (2006.01)
  *G08G 1/0968* (2006.01)
  *G01C 21/34* (2006.01)
  *G06N 20/00* (2019.01)
  *G01C 21/20* (2006.01)

(52) U.S. Cl.
  CPC ....... *G01C 21/3617* (2013.01); *G01C 21/343* (2013.01); *G01C 21/3415* (2013.01); *G01C 21/3484* (2013.01); *G06N 20/00* (2019.01); *G08G 1/096888* (2013.01); *G01C 21/20* (2013.01)

(58) Field of Classification Search
  CPC ............ G01C 21/3617; G01C 21/3415; G01C 21/3484; G01C 21/343; G01C 21/20; G06N 20/00; G08G 1/096888
  See application file for complete search history.

(56) References Cited

U.S. PATENT DOCUMENTS

| 7,512,487 | B1* | 3/2009 | Golding ............. G01C 21/3484 |
| | | | 701/424 |
| 9,195,290 | B2 | 11/2015 | Siliski et al. |
| 9,516,470 | B1 | 12/2016 | Scofield et al. |
| 10,149,111 | B1 | 12/2018 | Subbian |
| 2005/0102292 | A1* | 5/2005 | Tamayo ................ G06F 16/951 |

(Continued)

OTHER PUBLICATIONS

United States Office Action, U.S. Appl. No. 15/886,462, dated Nov. 18, 2019, 18 pages.

(Continued)

*Primary Examiner* — Russell Frejd
(74) *Attorney, Agent, or Firm* — Fenwick & West LLP

(57) ABSTRACT

An online system provides navigation information customized using travel preferences of users. The online system receives actions performed by users that may indicate their geographical locations of interest. The online system may use a model to predict a user's level of interest in destination geographical locations. The online system generates navigation information or travel information that describes routes from origin geographical locations of users to destination geographical locations to which the users are likely to travel. The online system transmits the navigation information to client devices for presentation as personalized or dynamically-created content items to users. The online system may generate navigation information using catalogs describing routes between geographical locations. For instance, the catalog indicates a vehicle for navigation along a route, as well as origin and destination geographical locations.

19 Claims, 7 Drawing Sheets

(56) References Cited

U.S. PATENT DOCUMENTS

| | | | |
|---|---|---|---|
| 2007/0073480 A1* | 3/2007 | Singh | G01C 21/3484 701/420 |
| 2007/0096945 A1 | 5/2007 | Rasmussen et al. | |
| 2007/0115922 A1 | 5/2007 | Schneider et al. | |
| 2007/0282526 A1* | 12/2007 | Smith | G01C 21/005 701/439 |
| 2009/0182498 A1* | 7/2009 | Seymour | G01C 21/3438 701/533 |
| 2010/0287261 A1* | 11/2010 | Welingkar | H04N 21/4126 709/219 |
| 2011/0050732 A1* | 3/2011 | Arrasvuori | G06Q 30/0261 345/666 |
| 2012/0215640 A1* | 8/2012 | Ramer | G06Q 30/0269 705/14.55 |
| 2012/0259706 A1* | 10/2012 | Lobaza | G01C 21/3679 705/14.62 |
| 2013/0122934 A1 | 5/2013 | Branch et al. | |
| 2014/0285526 A1 | 9/2014 | Ko et al. | |
| 2014/0337714 A1* | 11/2014 | Mu | H04L 67/02 715/234 |
| 2015/0005010 A1* | 1/2015 | Zhang | H04W 4/023 455/456.3 |
| 2016/0069699 A1* | 3/2016 | Chen | G01C 21/3605 701/426 |
| 2016/0088436 A1 | 3/2016 | Goss et al. | |
| 2016/0169696 A1 | 6/2016 | Butts, III et al. | |
| 2016/0202076 A1* | 7/2016 | Feng | G01C 21/343 701/408 |
| 2017/0295128 A1* | 10/2017 | Lyren | H04L 51/046 |
| 2018/0047091 A1 | 2/2018 | Ogden et al. | |

OTHER PUBLICATIONS

United States Office Action, U.S. Appl. No. 15/886,455, dated Mar. 5, 2020, 13 pages.

United States Office Action, U.S. Appl. No. 15/886,462, dated May 14, 2020, 20 pages.

\* cited by examiner

| | Destination | | | | |
|---|---|---|---|---|---|
| | 510 | 520 | 530 | 540 | 550 |
| 510 | X | | | | 200 |
| 520 | 300 | X | 300 | | |
| 530 | 300 | | X | | |
| 540 | | | 600 | X | 400 |
| 550 | | 700 | | 200 | X |

Origin (label for rows)

//<sub>1</sub>
NAVIGATION INFORMATION ON AN ONLINE SYSTEM

BACKGROUND

This disclosure generally relates to providing navigation information to users of an online system and determining geographical locations of interest to users.

Systems provide navigation information to users who are interested in traveling to geographical locations. The navigation information may indicate a particular route or vehicle from an origin geographical location to a destination geographical location. In addition, the navigation information may describe a vehicle such as an airplane or automobile for travel along the particular route. Users of a system may have different preferences for navigation or travel such as frequently visited routes or points of interest. One user may have certain a particular destination geographical location in mind and is interested in different types of routes to the destination. Another user be interested in visiting some geographical location but does not yet have a set destination in mind. It would be desirable for a system to determine personalized navigation or travel preferences of users.

SUMMARY

An online system provides navigation information that is customized using travel preferences of users. The online system receives actions performed by users that may indicate geographical locations of interest to the users. The online system may use a model to predict a user's level of interest in a given destination geographical location, or interest in visiting geographical locations in general. In addition, the model may determine one of multiple stages that represents a level of interest of the user and/or the predicted time frame for the user to make a plan to travel, and the online system may determine groups of users organized by the stages. The online system generates navigation information or travel information that describes routes from origin geographical locations of users to destination geographical locations to which the users are likely to travel. The online system transmits the navigation information to client devices for presentation as personalized or dynamically-created content items to users, for instance, having or being focused toward a specific one of the stages.

The online system may generate navigation information using catalogs describing routes between geographical locations. For instance, the catalog indicates a vehicle for navigation along a route, origin and destination geographical locations, route values, etc. The online system can generate catalogs using catalog information from providers, for example, by crawling webpages of providers. In some embodiments, the online system provides a template to a provider, and the provider uses the template to provide catalog information to the online system. The online system may periodically update catalogs as the online system continues to receive additional catalog information.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
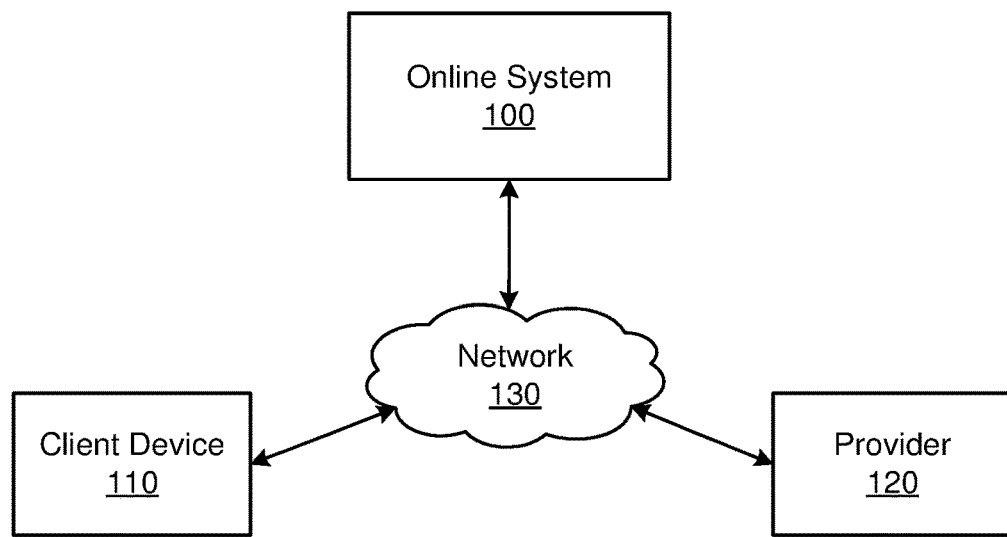
FIG. 1 is a diagram of an example system environment for providing navigation information by an online system according to one embodiment.

FIG. 1 is a diagram of a system environment for customizing content items according to one embodiment. The system environment includes an online system 100, one or more client devices 110, and one or more providers 120, connected to each other via a network 130 (e.g., the Internet). In other embodiments, different and/or additional entities can be included in the system environment. The online system 100 may provide navigation information to client devices 110 of users for presentation as content items. Additionally, the online system 100 uses a model to predict users' interest in navigating to geographical locations. Navigation information describes at least a route or travel plan from an origin geographical location to a destination geographical location, or other geographical location related information. Navigation information may also indicate a vehicle for navigation along a given route. In addition, the online system 100 can generate navigation information using a catalog of routes between geographical locations, where information of the catalog may be received from one or more providers 120.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. In one embodiment, a client device 110 executes an application (e.g., a browser) allowing a user of the client device 110 to interact with the online system 100 or a provider 120. In some embodiments, a client device 110 communicates with a server of the online system 100 or one or more providers 120 through an application programming interface (API) running on a native operating system of the client device 110, such as IOS® or ANDROID™.

In some embodiments, the client device 110 includes an image sensor (e.g., a camera) to capture media such as photos, images, videos, etc. Further, the client device 110 may also include one or more other types of sensors to generate sensor data, e.g., an audio sensor to record audio, or a global positioning system (GPS) sensor to determine the geographical location of the client device 110. Media captured by the client device 110 may include metadata such as the timestamp or geographical location at which the client device 110 captured the corresponding photo, image, video, etc.

A provider 120 provides navigation information or any other sort of travel information for presentation to users of client devices 110. In some embodiments, a provider 120 provides the navigation information to the online system 100. The online system 100 may send the navigation information to a client device 110, modify the navigation information before sending to a client device 110, or generate additional navigation information using the received navigation information. A provider 120 may be associated with a server different than another server of the online system 100 and outside of the domain of the online system 100. Servers of providers 120 and the online system 100 may communicate over the network, e.g., transmitting data such as navigation information. In some embodiments, the provider 120 may be associated an entity (e.g., a content provider or third party) offering one or more assets to users of the online system 100. As used herein, an asset is a navigation-related or geographical location-related object or service that users may acquire from a provider 120. For instance, an asset is transportation service, such as a flight, to a geographical location provided by the provider 120, or an asset includes an accommodation associated with the location. As other examples, an asset may be an activity such as a tour, concert, cruise, etc. Information describing assets may be organized in catalogs by providers 120 and/or online system 100. The online system 100 may receive navigation information or travel information from multiple providers 120, e.g., associated with different entities.

The online system 100 allows users of the online system 100 to communicate or otherwise interact with each other and access content. The online system 100 receives information about the users, for example, user profile information and information about actions performed by users on the online system 100 or a system of a provider 120. The online system 100 may use these information as signals that indicate geographical locations of interest to a user or user affinities in general, and determine predictions using the signals.

In some embodiments, the online system 100 is a social networking system. Users join the social networking system and add connections to other users to which they desire to be connected. At least some of these connections may be considered "friendship" type connections. Users of the social networking system may provide information about themselves, which is stored as user profiles. For example, users may provide their age, gender, current or past geographical locations (e.g., where users lived or visited), educational history, employment history and/or the like. The information provided by users may be used by the social networking system to direct information to the user. For example, the social networking system may recommend navigation information, social groups, events, other social networking objects, and potential connections (e.g., friends) to a user. A social networking system may also enable users to explicitly express interest in objects and/or concepts, such as brands, geographical locations, navigation information, information from a provider 120, celebrities, hobbies, sports teams, music, and the like. These interests may be used in a myriad of ways, including targeting content items and personalizing the user experience on the social networking system by showing relevant stories about other users of the social networking system based on shared interests.

In some embodiments, the online system 100 maintains and stores a social graph. The social graph includes nodes connected by a set of edges. Nodes represent users and other objects of the online system 100, such as web pages embodying concepts and entities, and edges connect the nodes. Each edge represents a particular interaction or connection between two nodes, such as a user expressing an interest in a news article shared by another user. As another example, an edge may represent a connection (e.g., a friendship-type relationship) established between two users. As such, the social graph includes data representative of the social signals of the social networking system. In one embodiment, the online system 100 generates the edges of the social graph based on the observed actions of its users.

Figure 2:
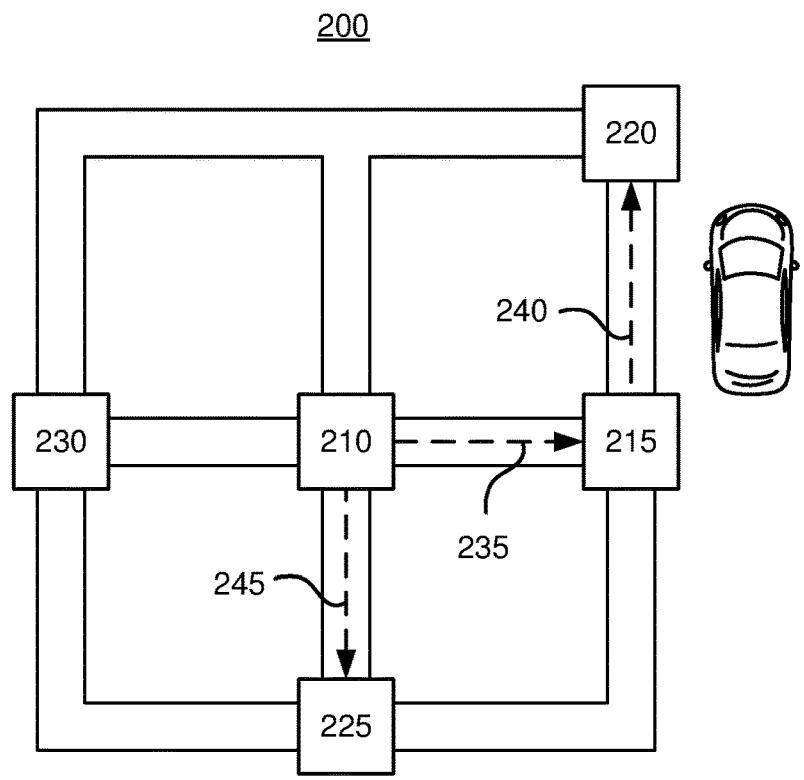
FIG. 2 is a diagram illustrating routes for navigation between geographical locations according to one embodiment.

FIG. 2 is a diagram 200 illustrating routes for navigation between geographical locations according to one embodiment. The diagram 200 includes geographical locations 210, 215, 220, 225, and 230. Geographical locations may include a residential or commercial building, transport hub (e.g., airport, train station, bus stop, port, etc.), outdoor area (e.g., park, beach, mountain, body of water, etc.), or other types of points of interest (POI) such as theme parks and attractions. Geographical locations may vary in scale, for instance, including streets, towns, cities, counties, states, countries, or other regions.

The online system 100 provides navigation information or other travel data describing routes or travel plans between the geographical locations. For example, the online system 100 determines that a user has an origin geographical location at 210 (e.g., the user's home city or state, or local area). Responsive to predicting that the user may be interested in the geographical location 225 (e.g., a destination location to which the user may travel or a predicted time frame of user intent to make a travel related acquisition), the online system 100 provides navigation information describing the route 245 or travel plan for getting from origin to destination). In some embodiments, navigation information is associated with an intermediate geographical location between the origin and destination geographical locations. For instance, responsive to predicting that the user wants to travel to the geographical location 220, the online system 100 provides navigation information describing a route including a first segment 235 from geographical location 210 to 215 and a second segment 240 from geographical location 215 to 220. The route may have a change in vehicle at the intermediate geographical location. For instance, geographical locations 210 and 215 are airports and geographical location 220 is a POI. The first segment 235 is a flight via an airplane, while the second segment 240 is a drive via an automobile. In other examples, the navigation information may be an indication of a flight that the user can take from origin to destination location with one or more layovers in between as intermediate locations.

II. Example System Architecture of Online System

Figure 3:
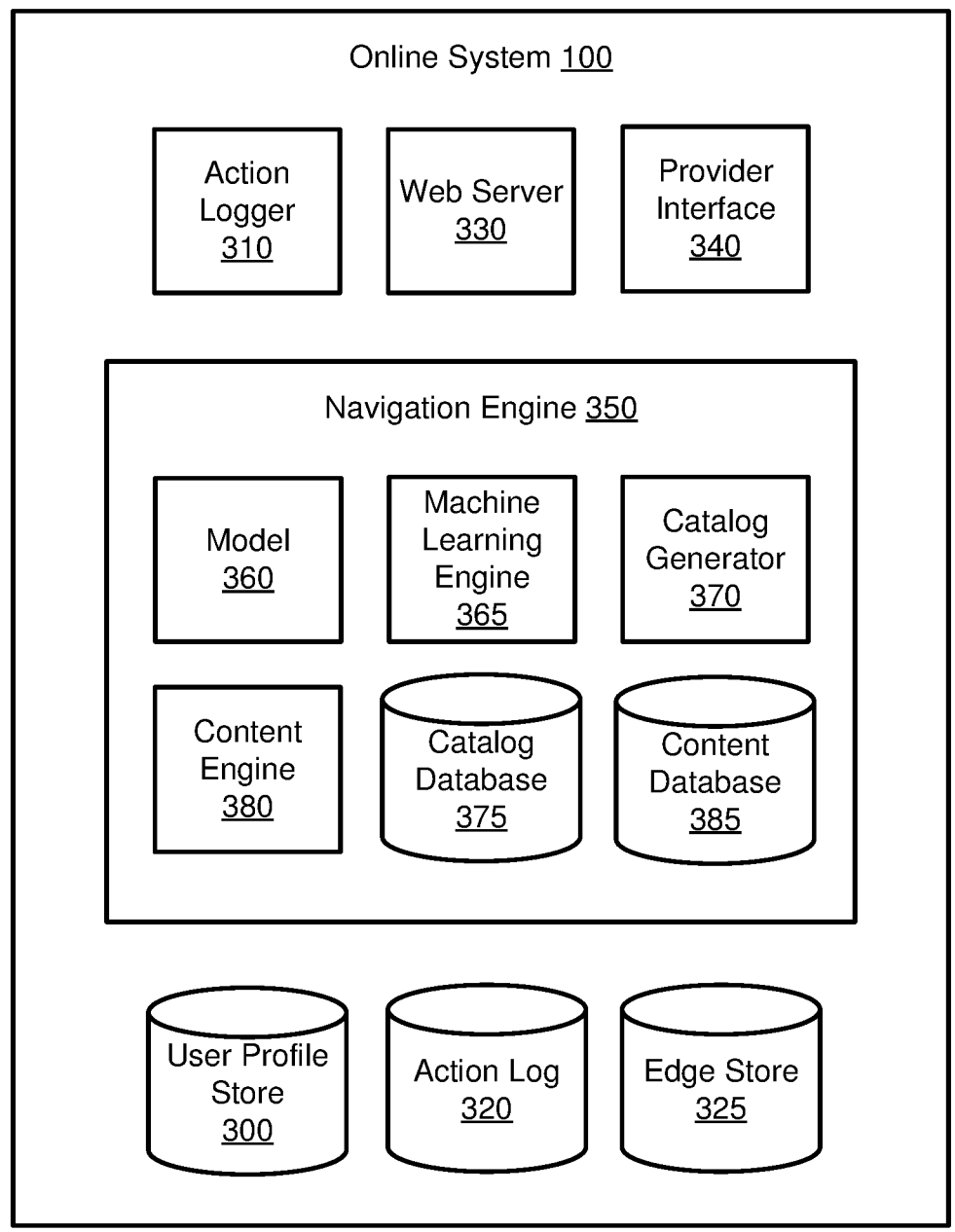
FIG. 3 is a block diagram of an example online system according to one embodiment.

FIG. 3 is a block diagram of an example online system 100 according to one embodiment. The online system 100 includes a user profile store 300, action logger 310, action log 320, edge store 325, web server 330, provider interface 340, and navigation engine 350. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 300 stores user profiles of users of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as family information, travel history, residence history, geographical locations, pets, membership of organizations (e.g., American Automobile Association (AAA), loyalty programs of providers 120, government organizations, veteran or military groups, or senior citizen groups), occupation, educational history, gender, hobbies or preferences, etc.

A user profile may also store other information provided by the user, for example, images, photos, videos, or other types of data from a client device 110. In certain embodiments, photos of users may be tagged with identification information of users of the online system 100 displayed in the photos. A user profile in the user profile store 300 may also maintain references to actions by the corresponding user performed on the online system 100. The user profile store 300 further stores data describing one or more relationships between different users and allows users to specify their relationships with other users. For example, these user-defined relationships allow users to generate relationships with other users that parallel the user's real-life relationships, such as friends, co-workers, partners, etc.

The user profile store 300 can store user profiles of individuals, as well as user profiles of entities associated with a provider 120. This allows an entity to establish a presence on the online system 100 for connecting and exchanging content with other users of the online system 100. The entity may post information about itself, or about navigation-related assets or services provided by the entity, to users of the online system 100 using a brand page of the entity's user profile. Users of the online system 100 may connect to the brand page to receive information posted to the brand page or to receive information from the brand page.

The action logger 310 receives communications about user actions internal to and/or external to the online system 100, populating the action log 320 with information about user actions. Examples of actions include adding a connection to another user, sending a message to another user, uploading media, reading a message from another user, viewing content provided by another user, attending an event posted by another user, among others. In addition, a number of actions may involve an object and one or more particular users, so these actions correspond to those users as well and stored in the action log 320.

The action log 320 may be used by the online system 100 to track user actions on the online system 100, as well as actions on providers 120 that communicate information to the online system 100. Users may interact with various objects on the online system 100 or a provider 120, and the action logger 310 stores information describing these interactions in the action log 320. Examples of interactions with objects include: interacting with navigation information (e.g., a content item), viewing a brand page of a provider 120, acquiring an asset, checking-in to or checking-out of a geographical location via a client device 110, expressing an affinity or preference for an object (e.g., associated with a geographical location), for example, by "liking" the object.

Additionally, the action log 320 may record a user's interactions with content (e.g., sponsored or non-sponsored content) on the online system 100 as well as with other applications operating on the online system 100 or a provider 120. In some embodiments, data from the action log 320 is used to infer interests, affinities, or preferences of a user, augmenting the interests included in the user's user profile and allowing a more complete understanding of user affinities. The action log 320 can record information about client devices 110 that a user uses to interact with the online system 100. For example, the action log 320 records whether the user used a laptop computer or smartphone client device 110 to interact with the online system 100. Further, the action log 320 may include information about the types of client devices 110, e.g., smartphone running an IOS® or ANDROID™ operating system.

The action log 320 may also store user actions performed on a provider 120, such as an external website or via a client device 110, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 320 can record information about actions that users perform on a provider 120 including webpage viewing histories, content that were engaged, acquisitions made, or other patterns from past actions. The action log 320 can also store information about user actions performed on a provider 120 received from the provider interface 340, which is further described below.

In one embodiment, the edge store 325 stores information describing connections between users and other objects on the online system 100 as edges. Edges may be defined by users, allowing users to specify their relationships with other users, e.g., that parallel the users' real-life relationships such as friends, co-workers, family members, etc. The action logger 310 may generate edges when users interact with objects in the online system 100, e.g., expressing interest in a page on the online system 100, sharing a link with other users of the online system 100, and commenting on posts made by other users of the online system 100.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or information describing demographic information about the user. Each feature may be associated with a source object or user, a target object or user, and a feature value. A feature may be specified as an expression based on feature values describing the source object or user, the target object or user, or interactions between the source object or user and target object or user; hence, an edge may be represented as one or more feature expressions.

In one embodiment, the edge store 325 stores information about edges, such as affinity scores for objects, interests, and other users. Affinity scores may be computed by the online system 100 over time to approximate a user's interest in an object or in another user in the online system 100 based on the actions performed by the user. Multiple interactions between a user and a specific object may be stored as a single edge in the edge store 325. Alternatively, each interaction between a user and a specific object is stored as a separate edge. In some embodiments, connections between users may be stored in the user profile store 300, or the online system 100 may access the edge store 325 to determine connections between users.

The web server 330 links the online system 100 via the network 130 to the client devices 110 and providers 120. The web server 330 serves web pages, navigation information, content items, catalog information, as well as other web-related content, such as JAVA®, FLASH®, XML and so forth. The web server 330 may receive and route messages between the online system 100, client devices 110, and providers 120, for example, instant messages, queued messages (e.g., email), text messages, short message service (SMS) messages, or messages sent using any other suitable messaging technique. A user may send a request to the web server 330 to upload information (e.g., images, photos, videos, etc.) that are stored by the online system 100 in the user profile store 300. Additionally, the web server 330 may provide application programming interface (API) functionality to send data directly to native client device operating systems, such as IOS®, ANDROID™, WEBOS® or RIM®.

The provider interface 340 receives information from providers 120 and stores the received information in a database of the online system 100, e.g., the user profile store 300, action log 320, catalog database 375, or content database 385. In some embodiments, the provider interface 340 receives, from a provider 120, catalog information or navigation information describing routes for which transportation (e.g., an asset) is provided by the provider 120. For example, an airline provides catalog information describing flights, while another provider provides catalog information describing train timetables. A route may be associated with at least one route value. A route value may be broken down into sub-values, e.g., for various types of compensation or prices for a flight or train ticket. In addition, route values may be valid for a predetermined window of time (e.g., a number of hours, days, or weeks). Information describing a flight may include one or more of: an origin and destination airport represented by International Air Transport Association (IATA) codes, a departure and arrival time, or a ticket type (e.g., first class, business class, or economy class), among other types of information. Catalog information stored in the online system 100 may be updated over time due to changes in inventory of assets, for example, availability of transportation along certain routes.

In some embodiments, the provider interface 340 receives information from providers 120 using pixel tracking. The provider interface 340 provides a pixel to a provider 120 to be included in a user interface associated with the provider 120. The provider 120 provides information to the provider interface 340 in response to a user of the online system 100 viewing or otherwise interacting with the pixel of the user interface. For example, the pixel is included in a user interface displaying a webpage of the provider 120, e.g., as part of a website for acquiring an asset. When the client device 110 of the user presents the pixel of the webpage on a display of the client device, the provider 120 provides information to the provider interface 340 indicating that the user viewed the website. Additionally, the information may describe an asset, and may indicate that the user was close to completing a process to acquire the asset, but has not yet completed the process.

In some embodiments, the provider interface 340 maintains pixel data integrity to by filtering out fictitious pixel data. For example, the provider interface 340 uses de-duplication to remove pixel data from a same client device 110 or IP address that is received within a short period of time. The provider interface 340 may also use majority voting to detect spoofed pixel data. In addition to pixel tracking, the provider interface 340 can also receive user information from cookies (also known as web cookies, Internet cookies, or browser cookies) of client devices 110.

The navigation engine 350 determines navigation information that may be personalized to users of the online system 100. In the embodiment shown in FIG. 3, the navigation engine 350 includes one or more models 360, machine learning engine 365, catalog generator 370, catalog database 375, content engine 380, and content database 385. In other embodiments, the navigation engine 350 may include additional, fewer, or different components for various applications.

The machine learning engine 365 trains the model 360 to predict users' interest in navigating to geographical locations. The model 360 may determine a level of interest in geographical locations generally, or a level of interest in a particular geographical location, for a given user (or group of users). The prediction may indicate a likelihood that a user will interact with navigation information or acquire an asset (e.g., within a given time frame), such as by clicking on an advertisement that may convert to a purchase of a flight that routes roundtrip between an origin location and a destination location. The machine learning engine 365 may implement any number of machine learning techniques known to one skilled in the art including boosted decision trees, factorization machines, support vector machines, classifiers (e.g., a Naive Bayes or linear regression), gradient boosting, neural networks, deep learning, etc. The machine learning engine 365 trains the model 360 using training data, which may include dense and/or sparse features. The machine learning engine 365 may retrieve training data from the user profile store 300, action log 320, edge store 325, other components of the online system 100, or other sources outside of the online system 100. In an embodiment, the machine learning engine 365 labels training data as positive responsive to determining that a user acquired an asset during a certain window of time, and labels training data as negative otherwise.

A trained model 360 determines a prediction for a user by processing one or more input signals, which may be indicative of the users' interest in one or more geographical locations, or interest in navigating to a geographical location in general. A signal may include user profile information or an action performed by the user (or other social data of the online system 100). For instance, a user who interacts with content describing a given geographical location is likely interested in navigating to the given geographical location. A user might click on content in a news feed of a social networking application that describes a travel destination, or may comment on another user's post about a trip that the other user just took to the travel destination. As another example, a user who resides nearby a transport hub will probably take routes via the transport hub. Signals may describe historical information aggregated over a period of time such as a user's preferred routes or type of vehicle according to previous navigation. In some embodiments, the model 360 determines different weights for different types of signals to determine predictions. For instance, a check-in at a POI (indicating that a user should have actually navigated to the POI) has a greater weight than visiting a website including information describing the POI. The navigation engine 350 may retrieve signals from the user profile store 300, action log 320, edge store 325, other components of the online system 100, or other sources outside of the online system 100.

In some embodiments, to determine predictions for a given user, the model 360 may also process input signals including user profile information or an action performed by one or more other users associated with the given user (e.g., social data). The other users may be connected to the given user on the online system 100, for instance, as friends, family, or co-workers. For example, the model 360 may include information about other users, e.g., friends, posting about a particular travel destination as an indication that the given user might also be interested in that travel destination. As another example, the navigation engine 350 determines other users that have at least one attribute in common with the given user, or at least one similar attribute to the given user. The attribute may be based on demographic data such as age, gender, ethnicity, socioeconomic status, geographical location (e.g., home residence), etc. Moreover, the attribute may be based on shared affinities such as membership to the same loyalty program, club, or other organization.

Using training data and signals, the model 360 can determine navigation or geographical location related affinities of users. The model 360 may determine the preferences by identifying patterns from previous routes, navigation, and geographical locations of users. For instance, the model 360 determines that a user has a preference for one type of geographical location (e.g., beaches) over a different type (e.g., cities). As another example, the model 360 may determine that a user tends to fly out of a certain airport, or prefers to take public transportation instead of driving between two cities. Further, the model 360 may determine that a user prefers routes that intersect or pass nearby a certain intermediate geographical location, e.g., a route to go home that passes by a grocery store or gym. In some embodiments, the model 360 determines that a user prefers routes that have a shorter expected distance traveled rather than a shorter expected time of travel, or vice versa.

In some embodiments, the model 360 determines a stage that indicates a user's level of interest in a geographical location. The model 360 selects the stage from a set of multiple stages, each of which representing a different level of interest. The stages may be organized in a funnel that is ordered by level of interest. For instance, "lower funnel" users have a greater level of interest than "upper funnel" users. The model 360 may determine that users having a level of interest greater than a first threshold level belong in the "lower funnel" stage, while users having a level of interest less than a second threshold level belong in the "upper funnel" stage. A user that is actively planning navigation/travel to a destination geographical location has a greater level of interest than another user who may be browsing multiple candidate geographical locations to visit, but without set plans yet. Thus, a "lower funnel" user may be closer to acquiring an asset using the online system 100, or stated differently for example, the user is likely to acquire an asset within the next X number of days (e.g., predicted to be close to purchasing a flight, hotel, etc. for a trip, such as within a few days of making a purchase, as opposed to being at the earlier upper funnel stage of generally searching travel destinations and considering which location to travel to for a vacation). In some embodiments, the model 360 learns that signals describing historical actions performed on the online system 100 are more indicative of predicted behavior of "upper funnel" users, while actions performed on providers 120 (e.g., browsing assets on websites) are more indicative of predicted behavior of "lower funnel" users. The model 360 may determine the level of interest according to weights of signals, e.g., acquiring transportation service to the destination geographical location is a stronger indicator of interest than viewing photos or videos of the candidate geographical locations.

In some embodiments, the model 360 determines a multiplier to be applied to a conversion probability indicating a likelihood that a user will acquire an asset or interact with a content item including navigation information (given that the online system 100 presents the content item to the user). The online system 100 may determine the conversion probability using one or more other models. The model 360 may determine the multiplier using a function that takes one or more inputs, for instance, a number of acquisitions of assets performed by the user during a recent period of time, or other information associated with the acquisitions.

The model 360 determines geographical locations for predictions using one or more catalogs from the catalog generator 370. The catalog generator 370 generates catalogs describing routes between geographical locations. A route is associated with one or more of: an origin geographical location, destination geographical location, departure time (e.g., expected), arrival time (e.g., expected), type of vehicle for navigation between the origin and destination, distance of the route (e.g., expected), duration of the route (e.g., expected), route value or price (e.g., price of a roundtrip flight between San Francisco and Paris), relevant media (e.g., a photo or video of a geographical location), a type of seat of the vehicle, a number of available or total seats of the vehicle, or other attributes. The catalog generator 370 may use standardized identifiers for routes or geographical locations such as road names, city names, or IATA codes. Moreover, different providers 120 may be configured to use the same type of identifiers to provide navigation information to the catalog generator 370.

In some embodiments, the catalog generator 370 provides a template to a provider 120. The catalog generator 370 receives catalog information formatted according to the template from the provider 120, and generates a catalog using the catalog information. The template may indicate one or more tags of catalog information that may be parsed from a webpage of the provider 120. For instance, the tags for a flight ticket indicate an origin and destination airport, image, and route value. In other embodiments, a provider 120 provides catalog information without necessarily having to use a template (e.g., provided in a feed file having XML format instead), and the catalog generator 370 may parse or format the catalog information to extract target information for a catalog.

The catalog generator 370 may generate catalogs using a heterogeneous source of catalog information. For example, the catalog generator 370 receives IATA codes for a set of airports from a first provider and receives route values for flights between the airports from a second provider. The catalog generator 370 may generate a catalog by aggregating the IATA codes, the route values, and media from the online system (e.g., photos of destination geographical locations of the flights). Additionally, the provider interface 340 may periodically crawl webpages or databases of a provider 120 or use pixel tracking (as previously described) to receive catalog information from providers 120. In some embodiments, the provider interface 340 prioritizes webpages that are frequently visited by users when crawling to collect catalog information. Using catalog information received from crawling webpages (or using other methods), the catalog generator 370 can keep an up-to-date inventory, for instance, by marking certain route values as stale if the corresponding routes are no longer available at a given point in time.

The catalog generator 370 may automatically generate a catalog, or at least a portion of a catalog, using information received by the online system 100. The information may be received from users of the online system 100 such as photos of geographical locations uploaded by users via client devices 110. The auto-generation may also be based on one or more master catalogs (e.g., including canonical lists of assets) maintained by the catalog generator 370. In one example use case, the catalog generator 370 generates a template including predetermined information such as a set of photos for popular destination geographical locations and IATA codes for nearby airports. In response to providing the template to a provider 120, the catalog generator 370 may receive route values for a route to one of the airports and a selection of one of the photos. Accordingly, the catalog generator 370 includes the route value along with the airport in a catalog, and the catalog generator 370 associates the route value with the selected photo. In other embodiments, the predetermined information may include user reviews (e.g., of the route, destination geographical location, etc.), videos or textual information, or information describing POIs nearby the destination geographical location.

The catalog generator 370 may store catalogs, catalog information, and templates in the catalog database 375. The catalog generator 370 may update existing catalogs or templates with new catalog information over time, e.g., due to changes in availability/inventory of routes or route values. The catalog generator 370 can also provide a user interface for providers 120 to manually add, remove, or edit catalogs. The catalog generator 370 may organize catalogs according to one or more attributes. For instance, a first set of catalogs describe flights in a particular geographical region provided by one or more providers 120, while a second set of catalogs describes public transit routes in another geographical region.

The content engine 380 generates navigation information using predictions determined by the model 360. The content engine 380 may provide the navigation information to users of the online system 100 as content items presented on client devices 110 of the users. For a given user, the content engine 380 may generate navigation information that describes a route to a destination geographical location in which the given user is likely interested, according to a prediction by the model 360. The content engine 380 may also provide navigation information generated by a provider 120. The content engine 380 can store previously received navigation information from the provider 120 in the content database 385 and retrieve the navigation information at a later time for presentation to users.

Navigation information may include one or more of the following information associated with a route (previously described above): destination geographical location, an origin geographical location, departure time (e.g., expected), arrival time (e.g., expected), type of vehicle for navigation between the origin and destination, distance of the route (e.g., expected), duration of the route (e.g., expected), route value or price, relevant media (e.g., a photo or video of a geographical location), a type of seat of the vehicle, a number of available or total seats of the vehicle, or other attributes. The content engine 380 may customize navigation information using a catalog or information from the user profile store 300, action log 320, or edge store 325. As an example, for a given user, the content engine 380 generates navigation information including a photo of a geographical location provided by a user who is connected to the given user, e.g., as a friend. The given user may be more likely to interact with navigation information that is personalized with content associated with connected users. As another example, the content engine 380 personalizes navigation information by determining that a user belongs to a loyalty program of a provider 120, e.g., based on user profile information. The content engine 380 may provide navigation information for presentation as a content item that includes a route value displayed using points of the loyalty program instead of using a unit of currency.

The content engine 380 may customize navigation information using stages determined by the model 360. In particular, the content engine 380 may generate different types of navigation information for "upper funnel" and "lower funnel" users. In an example use case, the navigation engine 350 determines that a "lower funnel" user (e.g., having a high level of interest) previously received navigation information from a provider 120. For instance, the "lower funnel" user frequently navigates to a geographical location using a transportation along a route provided by the provider 120. Thus, the content engine 380 generates navigation information describing routes to the same geographical location or routes having transportation provided by the same provider 120 by inferring that the user has an affinity for a particular brand of providers. As a different example, for an "upper funnel" user (e.g., having a low level of interest), the content engine 380 generates navigation information describing routes that are popular among a population of users, e.g., who have one or more attributes in common with the "upper funnel" user. The content engine 380 may determine popular routes or geographical locations using frequencies at which users took the routes or visited the geographical locations. If the online system 100 does not know a particular destination location for a user, the content engine 380 may determine routes from a known origin location (e.g., home city) to popular destination geographical locations.

In an embodiment, the navigation engine 350 determines that a user plans to take a given route from an origin to destination geographical location. Responsive to this determination, the content engine 380 may provide navigation information describing an alternate route. The content engine 380 may determine that the alternate route has a shorter distance, shorter travel time, or lower route value, in comparison to the given route. In some embodiments, the content engine 380 determines that the alternate route is associated with a different type of vehicle (e.g., car rental or ride sharing) or type of seat of the vehicle, which may be more preferable to the user (e.g., the user may prefer a business class seat in a flight over a coach seat). As other examples, the alternate route may have additional legroom for a seat or additional baggage allowance. In some embodiments, the content engine 380 may provide navigation information describing an intermediate geographical location located within threshold distance or time from the destination geographical location. Thus, the user may choose to navigate to the intermediate geographical location along the way to the destination geographical location, or after navigating to the destination geographical location (e.g., the user may visit a city in which the flight has a layover, and need a room to stay in that city). In an example use case, the content engine 380 provides content items describing hotels nearby a geographical location responsive to determining that a user will be traveling to the geographical location. As another example, the content engine 380 may use geolocation information from a client device 110 to determine that a user is at an airport for a layover and provide relevant content items, e.g., describing a lounge or restaurant at the airport. In an embodiment, the content engine 380 may provide a link for a user to install a mobile application on a client device 110, e.g., for flight check-in.

In some embodiments, the content engine 380 generates navigation information including sponsored content from a provider 120. For example, the provider 120 may wish to provide an advertisement to a user about one or more flights to a location in which the user has been predicted to have an interest. The online system 100 may receive a request from the provider 120 to present navigation information to users. Responsive to the request, the content engine 380 may determine to transmit the navigation information to client devices 110 for presentation as content items to users. In return, the provider 120 provides an amount of compensation according to user values of the users. For example, the online system 100 may assign a bid value to an advertisement, and the bids are considered in an auction in selecting which ad to show to a given user. If an ad of a provider 120 wins the auction, the provider 120 provides compensation to the online system 100 for showing the ad to the user. The content engine 380 may determine user values using predictions by the model 360. For instance, the user value for a user may be proportional to the user's level of interest in a geographical location, e.g., as indicated by a stage of the user. In some embodiments, the user value may be agnostic to navigation information or particular content items. The sponsored content may include, e.g., text, media, or any other suitable form of information to be presented to a user. For example, the sponsored content is to promote an asset of the provider 120. In various embodiments, sponsored content specifies a page of content, e.g., a landing webpage or a network address of a website for acquiring an asset, such as a website for acquiring accommodation (e.g., hotels) or a transportation (e.g., flights).

In an embodiment, the content engine 380 determines user values of navigation information by determining groups of users according to their levels of interest in navigating or interest in geographical locations. For instance, the user value is based on a conversion probability indicating a likelihood that a user will acquire an asset or interact with a content item including navigation information. Further, the content engine 380 may determine user values by using at least a multiplier determined by the model 360 for one or more users. In an example use case, the multiplier (e.g., a model score) is a numerical value between 0 and 2, inclusive, to be applied to a conversion probability. The content engine 380 boosts, e.g., increases, the conversion probability for groups of users having a multiplier between 1 and 2. The content engine 380 applies a soft constraint to groups of users having a multiplier between 0 and 1, for example, by down-ranking, e.g., decreasing, the corresponding conversion probabilities. The content engine 380 applies a hard constraint to groups of users having a multiplier equal to 0, for example, by removing these groups from consideration for receiving certain navigation information.

In some embodiments, the content engine 380 can determine user values in real-time, e.g., upon receiving a request to present a content item from the provider 120. Thus, the content engine 380 may use up-to-date information to determine the user values, for example, to account for changes to a catalog or signals from users. Moreover, the content engine 380 may pre-determine user values and retrieve the user values upon receiving a request from a provider 120. In some embodiments, the content engine 380 determines to transmit the navigation information responsive to determining that the navigation information satisfies a criteria, e.g., the route value or availability of transportation for the route decreases below a threshold value. For example, responsive to determining that a price of a flight drops or that there are a limited number of seats remaining for the flight, the content engine 380 may determine that a user is more likely to be interested in navigation information associated with the flight.

III. Example Routes

Figure 4:
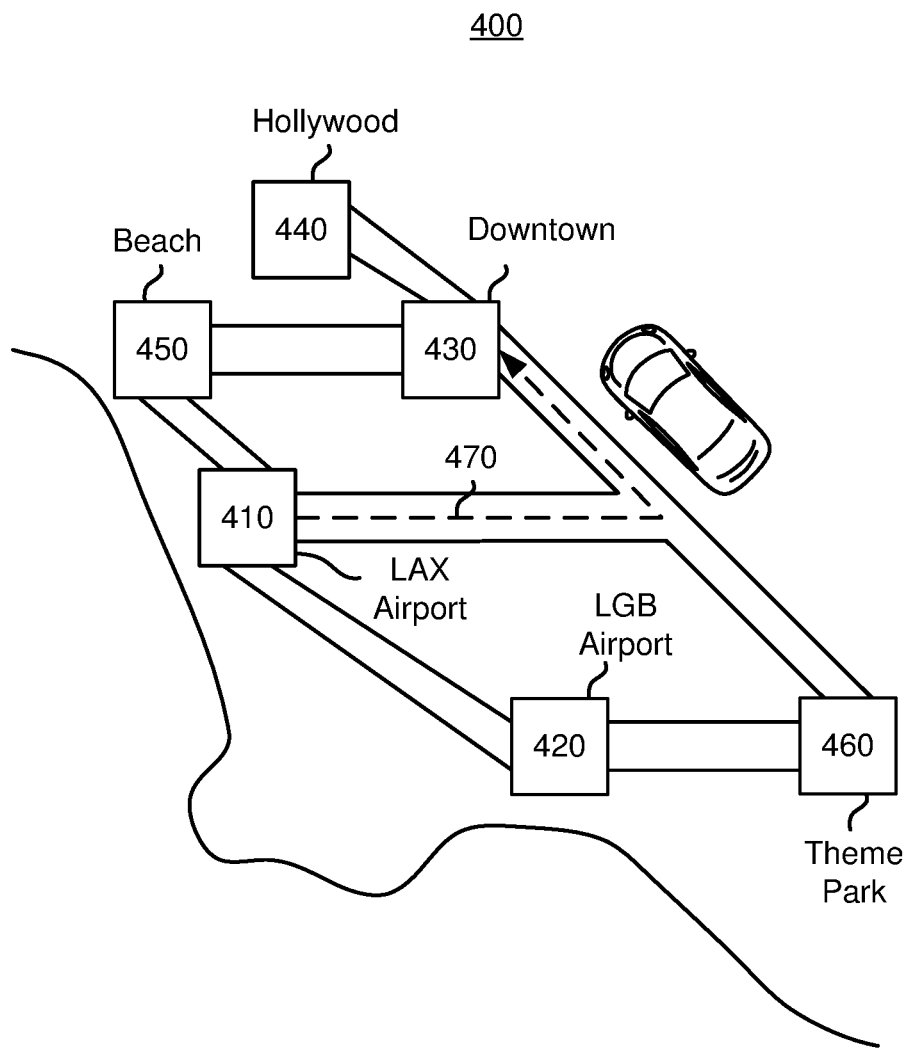
FIG. 4 is a diagram illustrating example routes for navigation on ground between geographical locations according to one embodiment.

FIG. 4 is a diagram 400 illustrating example routes for navigation on ground between geographical locations according to one embodiment. The example diagram 400 of the geographical region of Los Angeles includes transport hubs: Los Angeles International Airport (LAX) 410 and Long Beach Airport (LGB) 420. Additionally, the diagram includes POIs: downtown 320, Hollywood 440, beach 450, and theme park 460. The geographical locations are connected to each other by routes.

In one example, the navigation engine 350 determines that a user has previously visited several cities and thus is likely interested in navigating to the downtown 430 of Los Angeles city. Responsive to determining at least that downtown 430 is nearby LAX 410, the navigation engine 350 may provide navigation information describing a flight from an origin airport to LAX 410 for presentation on a client device 110 of the user. The user may interact with the navigation information to acquire a ticket for the flight from a provider 120. The navigation engine 350 may also provide navigation information describing a route 470 from LAX 410 to downtown 430. For example, the navigation information indicates a bus route, taxi, or ride sharing service. The navigation engine 350 may also determine that the user has an affinity for beach sports and movies and that Hollywood 440 and the beach 450 are within a threshold distance or travel time from downtown 430. Thus, the navigation engine 350 may provide additional navigation information describing routes from downtown 430 to Hollywood 440 and the beach 450. Alternatively, the navigation engine 350 may provide navigation information describing a route from LAX 410 to downtown 430 that passes by the beach 450 as an intermediate geographical location along the way.

In another example, the navigation engine 350 determines that a user has a family including young children. Based on training data, the model 360 determines that users of families including young children often visit theme parks. Further, the navigation engine 350 determines that the theme park 460 is located closer to LGB 420 than to LAX 410. Thus, the navigation engine 350 provides navigation information describing a flight from an origin airport to LGB 420 for presentation on a client device 110 of the user. In addition, the navigation engine 350 may provide navigation information describing a route from LGB 420 to the theme park 460, for instance, a rental car that the user can pick up at LGB 420 and use to drive to the theme park 460.

Figures 5A, 5B:
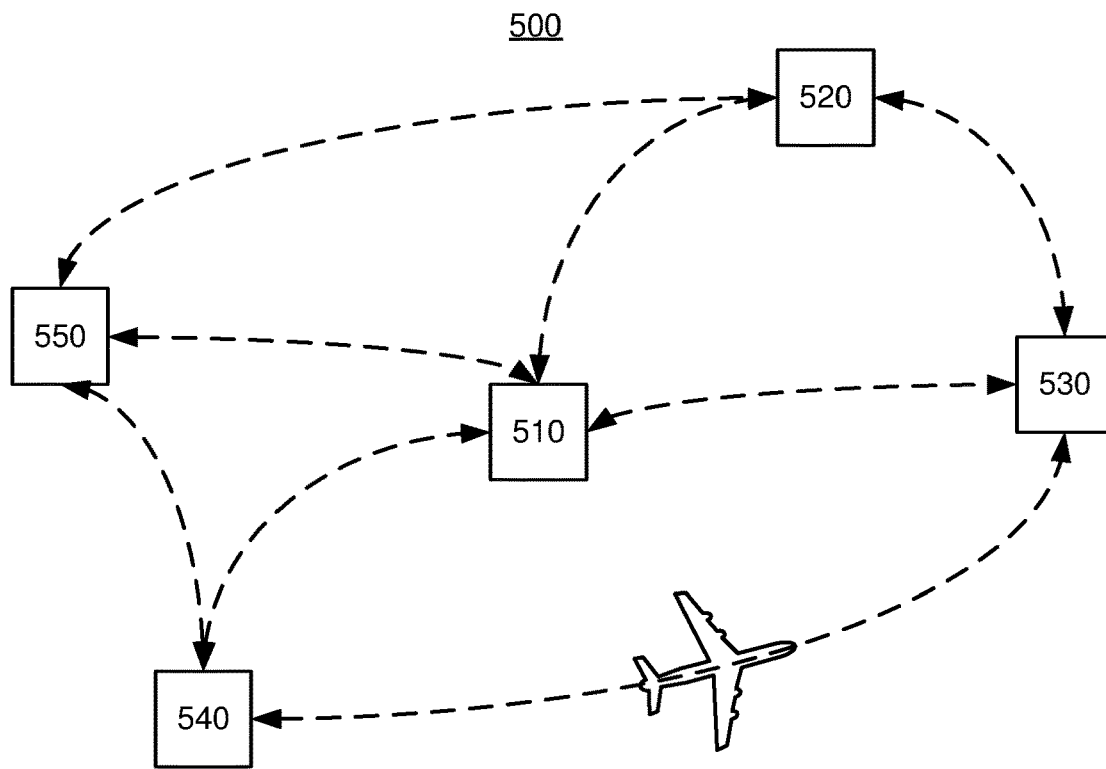
FIG. 5A is a diagram illustrating example routes for navigation in air between geographical locations according to one embodiment.
FIG. 5B is a diagram illustrating an example catalog of routes shown in FIG. 5A according to one embodiment.

FIG. 5A is a diagram 500 illustrating example routes for navigation in air between geographical locations according to one embodiment. The example diagram 500 includes airports 510, 520, 530, 540, and 550, which may be located in different cities, states, regions, countries, or any combination thereof.

FIG. 5B is a diagram illustrating an example catalog of routes shown in FIG. 5A according to one embodiment. Though the example catalog shown in FIG. 5B is a table of route information organized by rows of origin geographical locations and columns of destination geographical locations, in other embodiments, the catalog generator 370 may generate catalogs having any other suitable format. The table of the catalog includes route values for flights between various origin and destination pairs of the airports in the diagram 500. The route values can be, for example, prices of the flights. The table may exclude route values for pairs of the same airport (for both origin and destination). The table may include empty cells because some routes are unavailable or because the catalog generator 370 has not yet received information for those routes. The catalog generator 370 may update the catalog by adding, removing, or editing the route values over time as the online system 100 continues to receive new information from providers 120. In an embodiment, the catalog generator 370 generates a catalog using a data feed or bulk upload of information provided by a provider 120. The catalog generator 370 may update at least a portion of the catalog in real-time using additional information from the provider 120 (e.g., based on pixel tracking or webpage crawling). For instance, the data feed describes several million assets, and the additional information describes updates in values for a subset of the assets (e.g., a top percentage or threshold of assets acquired by users). The catalog generator 370 uses the additional information to update the subset, while information for the remaining assets remains the same.

IV. Example Process Flows

Figure 6:
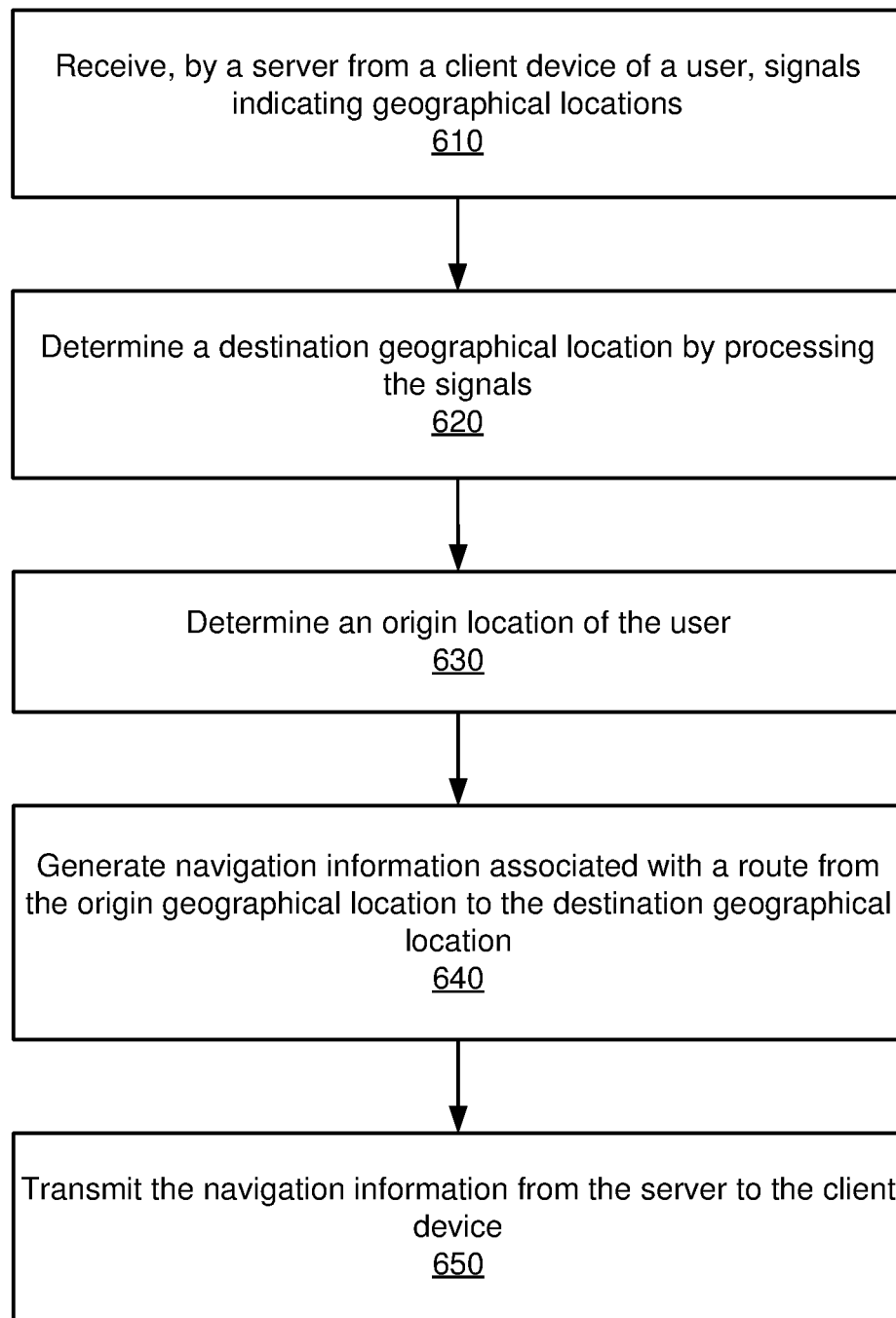
FIG. 6 is a flowchart illustrating a process for predicting navigation according to one embodiment.

FIG. 6 is a flowchart illustrating a process 600 for predicting navigation according to one embodiment. In some embodiments, the process 600 is performed by the online system 100 within the system environment in FIG. 1. The process 600 may include different or additional steps than those described in conjunction with FIG. 6 in some embodiments or perform steps in different orders than the order described in conjunction with FIG. 6.

In an embodiment, a server of the online system 100 receives 610 signals indicating geographical locations of interest to a user from a client device 110 of the user. For example, a tracking pixel on the website of a provider 120 (e.g., a travel site) can send to the online system 100 information about a search that a user conducted on the website, including certain details like the to/from locations that the user entered for a flight, the airport codes for airports searched, the time window for the trip including particular days traveling to each location, etc. Similarly, a mobile application can cause an application event to occur in which data is sent to the online system 100 describing actions taken by the user in the mobile application that might indicate the user is considering a trip. In addition, the signals can come from social data, such as the user posting on a social networking system about a trip being planned or commenting on another user's post about that user's trip.

The navigation engine 350 determines 620 a destination geographical location by processing the signals (e.g., the destination searched for in a user's search of a travel site). The destination geographical location is selected from a set of multiple geographical locations by a model 360 trained to predict interest of the user for the set geographical locations. In some embodiments, the model 360 predicts the user's intent to make a travel-related acquisition within a certain time frame. The navigation engine 350 determines 630 an origin geographical location of the user, such as the location where the user lives. The navigation engine 350 generates 640 navigation information associated with a route from the origin geographical location to the destination geographical location. For example, the online system can access a catalog of a provider 120 to determine different flights and prices of those flights for the user to travel from an origin to a destination geographical location. The content engine 380 transmits 650 the navigation information from the server to the client device 110, e.g., for presentation to a user. This information can be transmitted, for example, in a content item describing one or more travel options to a user, such that the user can click on the content item, visit a provider's website, and purchase travel options including hotels, flights, rental cars, etc. In some embodiments, the navigation information may not necessarily show the route, e.g., the navigation information does not include a visual depiction of the route visible to the user.

In some embodiments, the navigation engine 350 determines candidate routes from the origin geographical location to the destination geographical location. The navigation engine 350 may select one of the candidate routes as the route for the navigation information by determining that the candidate route also navigates to a given geographical location visited by the user, e.g., from previous travel. Accordingly, the user may be more familiar with the candidate route, and thus more likely to take the candidate route to the destination geographical location. In some embodiments, the content engine 380 provides the route to the client device 110 for presentation as an alternate to a different route. The routes may differ based on the physical route or other attributes. For example, the navigation engine 350 determines that the user acquired an economy ticket for a flight. The content engine 380 provides navigation information describing a first class ticket for the flight as an alternate to economy.

In an embodiment, the online system 100 performs a method that includes receiving actions performed by a user on a third party site (e.g., associated with a content provider 120) using a client device 110, where the actions indicate one or more geographical locations of interest to the user. The online system 100 accesses social data of the user (e.g., from the user profile store 300 or action log 320) indicating geographical locations of interest to other users connected to the user in the online system 100. The provider interface 340 of the online system 100 receives, from a content provider (e.g., provider 120), data describing multiple routes available from the content provider for travel from origin geographical locations to destination geographical locations. The data may also describe values for each of the routes. The online system 100 provides the received actions performed by the user and the social data of the user as inputs to a model trained to predict interest of the user for a destination geographical location and to predict status (e.g., stage of a funnel or time frame for navigation or travel) of the user in terms of planning to travel to the destination geographical location.

The navigation engine 350 determines, from the received data describing the multiple routes available, a route from an origin geographical location of the user to the destination geographical location. The navigation engine 350 determines a current value of the route from the received data describing values of the routes. Since route values may change frequently (e.g., by the hour based on changes in supply or demand), the navigation engine 350 may determine the current value using updated catalog information or from an online feed of immediate pricing. The content engine 380 generates a content item describing the route. The content engine 380 may personalize the content item to the user based on the prediction by the model such that a different type of content item is shown to the user based on status of the user in planning to travel. For example, "upper funnel" and "lower funnel" users may be presented with different types of content items. In addition, the content engine 380 determines to include the current value of the route in the content item based on whether the current value is likely of interest to the user. For instance, the content engine 380 determines that a user is likely to acquire a flight ticket responsive to determining that the price of the ticket within a threshold difference from an average price of tickets previously acquired by the user. In a different example, the content engine 380 may determine to exclude a value from a content item responsive to determining that the value is greater than a threshold value. The content engine 380 transmits the content item to the client device 110 for presentation to the user.

Figure 7:
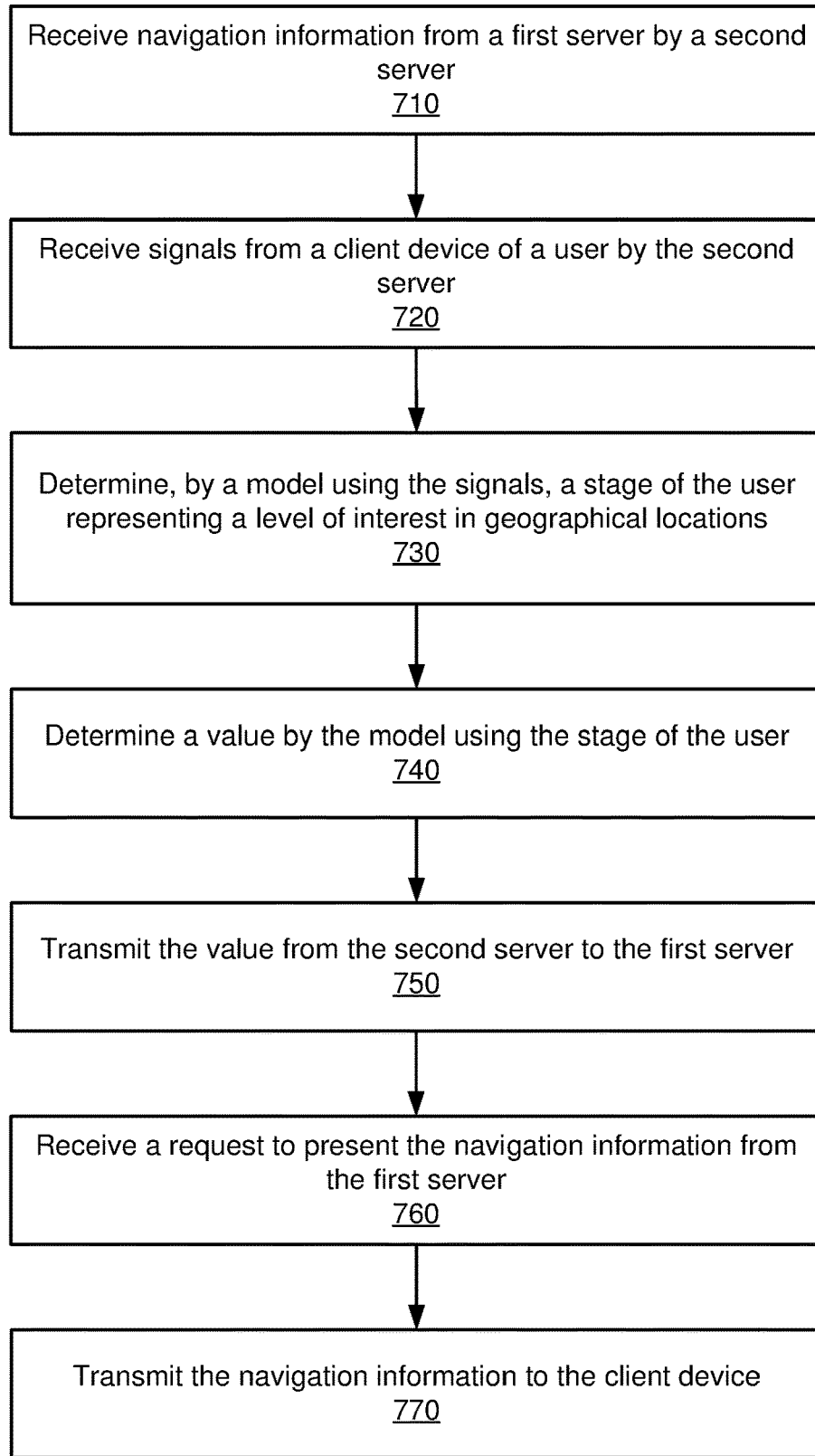
FIG. 7 is a flowchart illustrating a process for providing navigation information according to one embodiment.

FIG. 7 is a flowchart illustrating a process 700 for providing navigation information according to one embodiment. In some embodiments, the process 700 is performed by the online system 100 within the system environment in FIG. 1. The process 700 may include different or additional steps than those described in conjunction with FIG. 7 in some embodiments or perform steps in different orders than the order described in conjunction with FIG. 7.

In an embodiment, the online system 100 receives 710 navigation information from a first server of a provider 120, and by a second server of the online system 100. The second server of the online system 100 receives 720 signals from a client device 110 of a user, where the signals indicate geographical locations of interest to the user. A model 360 of the second server determines 730 a stage of the user using the signals. The model 360 selects the stage from a set of multiple stages (e.g., a "conversion funnel") each representing a different level of interest in a set of geographical locations. The model 360 determines 740 a value of the user (e.g., a user value) using the stage of the user. The second server of the online system 100 transmits 750 the value to the first server of the provider 120. Responsive to transmitting the value, the second server receives 760, from the first server, a request to present the navigation information to the user. The content engine 380 transmits 770 the navigation information to the client device 110.

In some embodiments, the navigation engine 350 determines that a user is likely to travel to a destination geographical location within a given period of time (e.g., a particular time frame) associated with the navigation information. Responsive to the determination, the content engine 380 transmits the navigation information to the client device 110 by the end of the period of time. For example, the navigation information describes a flight and is associated with a departure date, where the period of time is from at least the present time to the departure date. Thus, the content engine 380 transmits the navigation information before the departure date because the user cannot take the flight after it has already departed, and thus would not want to acquire a ticket for the flight after the period of time.

In an embodiment, the online system 100 performs a method that includes receiving actions performed by a user on a site of a content provider (e.g., associated with a provider 120 or third party) using a client device 110, where the actions indicate one or more geographical locations of interest to the user. The online system 100 provides the received actions performed by the user to a model 360 trained to predict status of the user in terms of planning travel (e.g., user intent for navigation information or making a purchase). The model 360 uses the predicted status of the user to determine a value (e.g., a user value or bid value) for presenting a content item of the content provider to the user. In particular, the value may be based on the likelihood that the user will convert for the content item, for example, by clicking on an ad or acquiring an asset from the content provider. Additionally, the content item is associated with a route to a destination geographical location, e.g., a flight ticket. In various embodiments, the model 360 predicts a probability that the user will make a travel-related purchase within a given time frame. The model 360 may be trained using features that are agnostic to third parties and based on travel intent of a segment of users (e.g., "upper funnel" or "lower funnel"). The training data may include social data such as actions performed by other users of the online system 100 or via pixel tracking data. Furthermore, the model 360 may dynamically adjust the value during runtime for an auction based on updated user information or route values from a catalog. Responsive to transmitting the value to the content provider, the content engine 380 receives a request from the content provider to present the content item to the user. Additionally, the content engine 380 transmits the content item to the client device 110 for presentation to the user.

Figure 8:
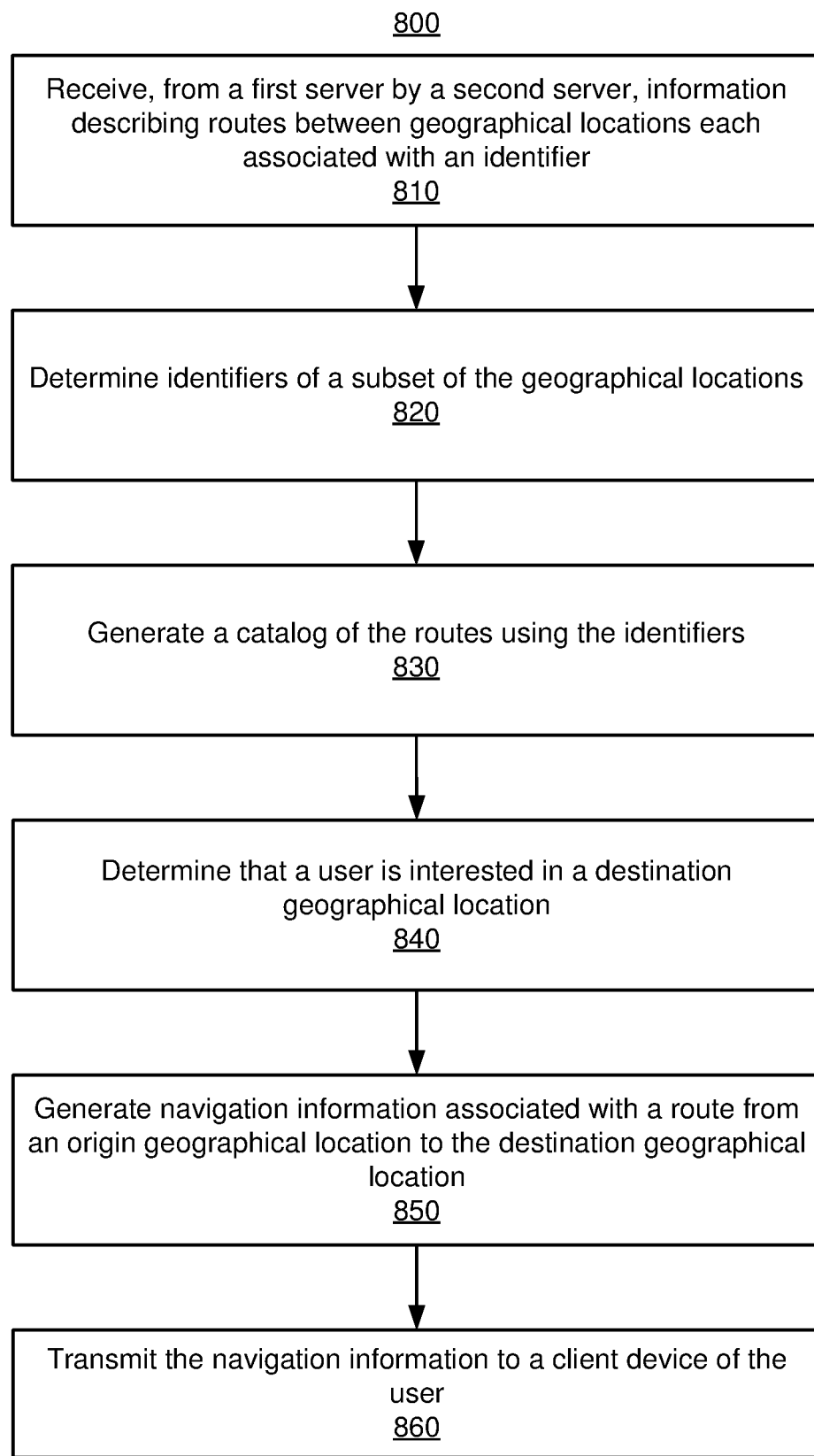
FIG. 8 is a flowchart illustrating a process for generating navigation information according to one embodiment.

FIG. 8 is a flowchart illustrating a process 800 for generating navigation information according to one embodiment. In some embodiments, the process 800 is performed by the online system 100 within the system environment in FIG. 1. The process 800 may include different or additional steps than those described in conjunction with FIG. 8 in some embodiments or perform steps in different orders than the order described in conjunction with FIG. 3.

In an embodiment, the online system 100 receives 810 information from a first server, of a provider 120, by second server of the online system 100. The information describes routes between geographical locations each associated with an identifier, and the information may be received using pixel tracking. The navigation engine 350 (of the second server) determines 820 identifiers of at least a subset of the geographical locations. The catalog generator 370 (of the second server) generates 830 a catalog of the routes using the identifiers. The navigation engine 350 determines 840 that a user is interested in a destination geographical location of the geographical locations. The content engine 380 (of the second server) generates 850 navigation information using the catalog. The navigation information is associated with a route from an origin geographical location of the user to the destination geographical location. The content engine 380 transmits 860 the navigation information to a client device 110 of the user.

In some embodiments, the catalog generator 370 transmits a template of the catalog to the first server of the provider 120. The first server is configured to provide the information describing the routes using the template. The catalog generator 370 may also generate the catalog by aggregating the information from the provider 120 with additional information received from a different provider of navigation information.

In an embodiment, the online system 100 performs a method that includes receiving information from a content provider (e.g., associated with a provider 120 or third party) describing routes between geographical locations each associated with an identifier (e.g., airport IATA codes). For example, the online system 100 crawls a website of the content provider for information about assets or inventory that may be used to generate ads. The navigation engine 350 determines identifiers of at least a subset of the geographical locations. The catalog generator 370 of the online system 100 generates, for the content provider, a catalog of the routes using the identifiers. The navigation engine 350 determines (e.g., using the model 360) that a user is interested in a destination geographical location of the geographical locations. The content engine 380 transmits a content item of the content provider to a client device 110 for presentation to the user, where the content item describes the destination geographical location. The content engine 380 may customize the content item using a photo or video of a popular travel or vacation destination.

In various embodiments, a non-transitory computer-readable storage medium stores instructions that when executed by a processor causes the processor to execute one or more of the above-described processes/methods in FIGS. 6-8.

The online system 100 solves a technical problem faced by providers 120 and associated entities that want to promote their assets (e.g., flight tickets, train tickets, transportation services, travel activities, etc.) to users of the online system 100 who may be interested in acquiring one or more of the assets. In conventional systems, the entities may provide sponsored content to the users, but the sponsored content may be the same or similar from user-to-user, and thus may be perceived by users as being generic. Since users may typically be less interested in generic content, the users are less likely to interact with the sponsored content. Consequently, the entities and/or the conventional systems are not efficiently using their computational resources to provide navigation information or other content to users (e.g., memory to store content items or network bandwidth to transmit content items and navigation information from servers to client devices 110).

In contrast to conventional systems, the online system 100 leverages signals describing actions performed by users, social data, or other information collected by the online system 100 or providers 120 to customize processes for providing content items based on navigation information. Thus, the online system 100 can enable providers 120 to target users that are more likely to engage with content items, e.g., that are personalized to the target users. As previously described, the online system 100 may use a model 360 to determine different stages of users (e.g., of a "conversion funnel") that represent their levels of interest in navigating to geographical locations, which may be correlated with the probabilities that the users will acquire an asset associated with a content item. Providers may use the granularity in user intent indicated by different stages to target broader audiences of users (e.g., who are thinking about traveling) with one type of content item, while targeting a narrower audience of users (e.g., who are close to making a travel-related acquisition of an asset) with another type of content item.

As a result, users who are presented with customized content items (e.g., tailored to their affinities or affinities of their friends) may be more likely to interact with sponsored content included in the customized content items. As other examples, the online system 100 may customize content items based on attributes of users, e.g., including images of wine or business class-related content for luxury travelers, family-related content for users with children, or savings related content for budget travelers. Therefore, entities associated with providers 120 may receive greater engagement from users acquiring assets of the entities, and online systems 100 may also receive greater compensation from the providers 120 in return for presenting sponsored content to users included in content items or navigation information.

The online system 100 can also reduce the onboarding time of providers 120 that want to provide navigation information or content items to users. Instead of requiring providers 120 to manually format and provide information describing their assets, the catalog generator 370 can automatically collect catalog information to generate a catalog, for example, describing routes for which a provider 120 is offering transportation services. Additionally, the catalog generator 370 may provide templates of catalogs to help providers 120 start prospecting for users who may be interested in navigation information or acquiring assets of the providers 120.

The problems addressed by the online system 100 is unique to systems providing content items over the Internet (e.g., the network 130) in an online environment. For example, entities that provide sponsored content online seek to increase metrics such as online views of content items or webpages, click-through rate (CTR) of content items, conversion rates (CVR) of users completing a process to acquire assets from the entity, or a return on an amount of resources allocated by providers 120 for providing content items to users via the online system 100.

V. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a server from a client device of a user, signals indicating geographical locations of interest to the user;
determining a stage of the user, the stage selected from a plurality of stages each representing a different level of interest in a plurality of geographical locations wherein the stage is determined responsive to determining that the user is likely to acquire an asset associated with at least one of the plurality of geographical locations within a period of time, wherein the asset is offered by a third-party provider;
determining a destination geographical location by processing the signals, the destination geographical location selected from the plurality of geographical locations by a machine learning model trained to predict interest of the user for the plurality of geographical locations, wherein the machine learning model selects the destination geographical location at least according to the stage;
determining an origin geographical location of the user;
generating navigation information associated with a route from the origin geographical location to the destination geographical location; and
transmitting the navigation information from the server to the client device.

2. The method of claim 1, wherein the navigation information indicates a vehicle for navigation along the route.

3. The method of claim 2, wherein the navigation information indicates at least one of a duration of time or distance to navigate from the origin geographical location to the destination geographical location using the vehicle.

4. The method of claim 1, further comprising:
determining a plurality of candidate routes from the origin geographical location to the destination geographical location;
determining that a candidate route of the plurality of candidate routes navigates to a given geographical location visited by the user; and
selecting the candidate route as the route for the navigation information.

5. The method of claim 1, further comprising:
receiving sponsored content from the third-party provider, the sponsored content describing a vehicle for the route, wherein the navigation information is generated using the sponsored content.

6. The method of claim 1, further comprising:
receiving additional signals by the server from a plurality of client devices of users connected to the user on an online system, the additional signals indicating interest of the users for the plurality of geographical locations; and
wherein the machine learning model uses at least the additional signals to select the destination geographical location.

7. The method of claim 1, further comprising:
determining a change in value associated with the route; and
wherein transmitting the navigation information to the client device is responsive to determining that the change in value satisfies one or more criteria.

8. The method of claim 1, further comprising:
determining, using at least the stage, that the user is interested in taking a different route from the origin geographical location to the destination geographical location; and
wherein transmitting the navigation information to the client device includes providing the route for presentation as an alternate to the different route.

9. The method of claim 1, further comprising:
determining, using at least the stage, that the user is interested in an intermediate geographical location; and
determining that the destination geographical location is located within a threshold distance or time from the intermediate geographical location.

10. The method of claim 9, wherein the intermediate geographical location is between the origin geographical location and the destination geographical location along the route.

11. The method of claim 1, wherein the plurality of stages includes at least a lower funnel stage corresponding to users who are actively planning travel to destination geographical locations and an upper funnel stage corresponding to users who are browsing candidate geographical locations.

12. A non-transitory computer-readable storage medium storing instructions that when executed by a processor cause the processor to perform steps including:
receiving, from a client device of a user, signals indicating geographical locations of interest to the user;
determining a stage of the user, the stage selected from a plurality of stages each representing a different level of interest in a plurality of geographical locations, wherein the stage is determined responsive to determining that the user is likely to acquire an asset associated with at least one of the plurality of geographical locations within a period of time, wherein the asset is offered by a third-party provider;
determining a destination geographical location by processing the signals, the destination geographical location selected from the plurality of geographical locations by a machine learning model trained to predict interest of the user for the plurality of geographical locations, wherein the machine learning model selects the destination geographical location at least according to the stage;
determining an origin geographical location of the user;
generating navigation information associated with a route from the origin geographical location to the destination geographical location; and
transmitting the navigation information to the client device.

13. The computer-readable storage medium of claim 12, wherein the navigation information indicates a vehicle for navigation along the route.

14. The computer-readable storage medium of claim 13, wherein the navigation information indicates at least one of a duration of time or distance to navigate from the origin geographical location to the destination geographical location using the vehicle.

15. A method comprising:
receiving, by an online system, a plurality of actions performed by a user on a third party site using a client device, the plurality of actions indicating one or more geographical locations of interest to the user;
determining a stage of the user, the stage selected from a plurality of stages each representing a different level of interest in a plurality of geographical locations wherein the stage is determined responsive to determining that the user is likely to acquire an asset associated with at least one of the plurality of geographical locations within a period of time, wherein the asset is offered by a third-party provider;

accessing, by the online system, social data of the user indicating geographical locations of interest to other users connected to the user in the online system;

receiving, by the online system from the third-party provider, data describing a plurality of routes available from the third-party provider for travel from origin geographical locations to destination geographical locations and data describing a value for each of the routes;

providing the received actions performed by the user and the social data of the user as inputs to a machine learning model trained to predict interest of the user for a destination geographical location and to predict status of the user in terms of planning travel to the destination geographical location, wherein the machine learning model predicts the interest of the user for the destination geographical location at least according to the stage;

determining, from the received data describing the plurality of routes available, a route from an origin geographical location of the user to the destination geographical location;

determining a current value of the route from the received data describing values of the routes;

generating a content item describing the route, the content item personalized to the user based on the prediction by the machine learning model such that a different type of content item is shown to the user based on the status of the user in planning travel, and wherein the current value of the route is included in the content item based on whether the current value is likely of interest to the user; and transmitting the content item to the client device for presentation to the user.

16. The method of claim 15, wherein the content item indicates a vehicle for navigation along the route.

17. The method of claim 16, wherein the content item indicates at least one of a duration of time or distance to navigate from the origin geographical location to the destination geographical location using the vehicle.

18. The method of claim 15, further comprising:
determining, using at least the status, that the user is interested in taking a different route from the origin geographical location to the destination geographical location; and
wherein transmitting the content item to the client device includes providing the route for presentation as an alternate to the different route.

19. The method of claim 15, further comprising:
determining, using at least the status, that the user is interested in an intermediate geographical location; and
determining that the destination geographical location is located within a threshold distance or time from the intermediate geographical location.

* * * * *